Sept. 20, 1932.  E. GERLACH  1,877,844
REPRODUCER FOR SOUND FILMS

Original Filed Oct. 19, 1927

Inventor:
Erwin Gerlach
by Lowe & Kehlenbeck
Attorneys.

Patented Sept. 20, 1932

1,877,844

UNITED STATES PATENT OFFICE

ERWIN GERLACH, OF BERLIN-SIEMENSSTADT, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

REPRODUCER FOR SOUND FILMS

Original application filed October 19, 1927, Serial No. 227,201, and in Germany April 9, 1927. Divided and this application filed December 31, 1931. Serial No. 584,079.

My present application is a division of my earlier application filed in the United States Patent Office on October 19, 1927, Serial No. 227,201.

In sound films of the type in which the sound record is formed by the boundary between a darkened (exposed) and a light (unexposed) portion of the film, there are frequently spots or other defects on the unexposed portion, and these cause undesirable rustling noises during reproduction, thereby disturbing the true sounds of the picture, particularly at points where such sounds are soft.

The object of my present invention is to overcome the drawback above referred to. For this purpose, during reproduction of the film, I cover the unexposed portion of the part of the film carrying the sound record, exactly or approximately up to a line connecting the main crests or general apices of the sound-record curve. I prefer to accomplish this by means of a special diaphragm covering the film in the manner just explained. Such diaphragm may be actuated by hand, or it may be controlled by the sound record itself; the latter is the preferred construction. The automatic control may be effected by providing an auxiliary source of light and an auxiliary photo-electric cell associated therewith, which cell receives from said source an amount of light governed by the traveling sound record. In circuit with this auxiliary cell I arrange one or more choke coils and, in certain cases, condensers in parallel therewith, so that the diaphragm will be controlled only in response to the fluctuations in the mean value of the photo-electric cell current corresponding to the sound record.

Figure 1:
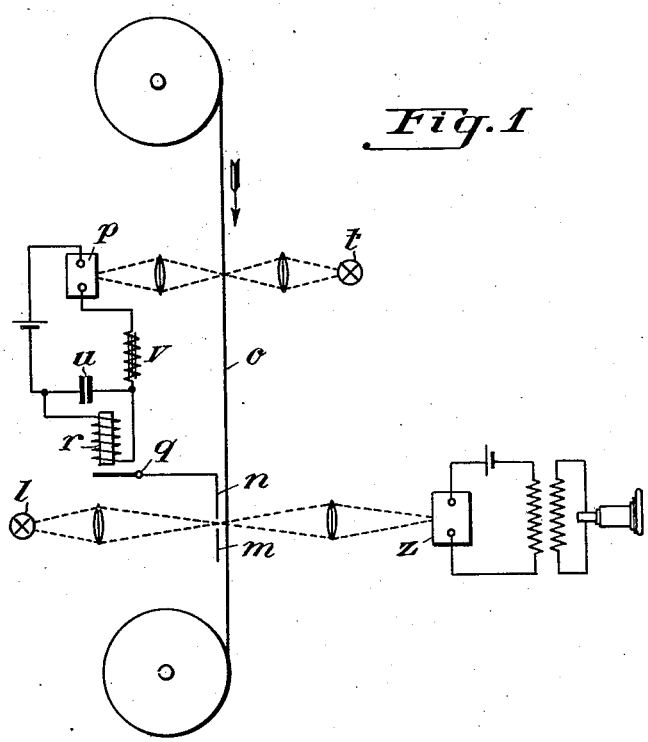
Figure 2:
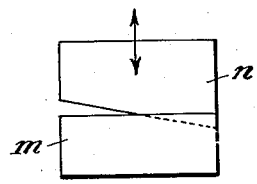

Reference is to be had to the accompanying drawing, in which Figs. 1 and 2 are diagrammatic views showing two embodiments of my invention.

The reproducing apparatus illustrated comprises a source of light $l$, an optical system indicated by the two lenses, and a photoelectric cell $z$, with the circuit of which the reproducing loud speaker is connected directly or indirectly. The beam of light proceeding from the source $l$ is controlled by the sound film $o$, the fluctuations of light producing, in the well-known manner, corresponding fluctuations of current in the photoelectric cell $z$, which current fluctuations in turn are converted into sound fluctuations in the loud speaker $s$. The reproducing apparatus includes a diaphragm or shutter consisting of a stationary member $m$ and a movable member $n$. By means of a lever $q$ fulcrumed at $q'$, the movable shutter member $n$ is connected with the armature of an electromagnet $r$ energized by the current of an auxiliary system. This system comprises an auxiliary source of light $t$, a second optical or lens system, and a second photo-electric cell $p$. The sound film $o$ (that is, the sound record on said film) controls the beam of light proceeding from the auxiliary source $t$, in the same manner that it controls the beam of light proceeding from the source of light $l$ in the main system.

The currents of the photo-electric cell $p$ are made to energize the electromagnet $r$, an amplifier (not shown) being preferably interposed between the cell $p$ and said electromagnet. Whenever the armature of the magnet $r$ moves, the lever $q$ will cause the shutter member $n$ to be shifted, the construction and arrangement of the members $m$, $n$ being such that the shifting of the movable member $n$ will alter the width (transversely of the film) of that portion of the beam of light proceeding from the source $l$ which the shutter $m$, $n$ permits to reach the film at that particular moment. For instance, as shown in Fig. 2, the member $m$ may have a horizontal upper edge, and the member $n$ an inclined lower edge, it being obvious that according as the member $n$ is raised or lowered, the horizontal dimension or width of the wedge-shaped slit or opening shown at the left, will be increased or decreased. The effective width of the beam of light is thus varied, the control being effected in such a manner that the shutter will exclude light from the transparent portion of the film exactly or approximately to a line connecting the general apices of the sound-record curve. The extent to which the shuttering action is carried, and therefore the extent to which the shutter member $n$ moves, are governed by the amplitude of the same sound record which modulates the current in the photo-electric cell $p$.

In order that the shutter member $n$ controlled by the electromagnet $r$ may be shifted only in accordance with the shape of said line connecting the general apices of the sound-record curve, and may not be shifted in the rhythm of the sound fluctuations themselves, I prefer to provide, in the circuit connecting the photo-electric cell $p$ and the electromagnet $r$, one or more choke coils $v$ and condensers $u$. Such a unit $v$, $u$ constitutes a filter chain preventing the electromagnet $r$ from being affected by currents corresponding to relatively rapid sound vibrations. The filter chain however does not interfere with the control of the electromagnet by currents of relatively low frequency corresponding to slow variations in the intensity of the sound.

Instead of providing choke coils in the circuit as referred to above, I may obtain the same result by giving the beam of light proceeding from the source $t$ such a width, at the point of its passage through the film $o$, that it will be a multiple of the width of a single wave of the lowest sound frequency recorded. In this case also, only the mean amplitude of the sound record curve will influence the shutter $m$, $n$, the latter not being affected by the individual waves or vibrations. The distance between the main optical system $l$, $m$, $n$, $s$ and the auxiliary system $p$, $t$ is so selected that the time which the film $o$ takes to travel this distance will be equal to the reaction time of the auxiliary system from the moment of the modulation of the beam of light proceeding from the source $t$, to the moment when the shutter member $n$ moves. In the main, this reaction time depends on the inertia of the photo-electric cell $p$, the action of the chokes $v$ in delaying the rise of the current, and the winding of the electromagnets $r$.

The form of shutter shown in Fig. 2, while known in connection with other devices, is novel in the particular relation in which I employ it, and is of special advantage in connection with my present invention. The two co-operating edges of the shutter members $m$, $n$, form an acute angle with each other, and thus any up or down movement of the member $n$ (as indicated by the arrow) will effect a change in the width of the covered or overlapping portions of these members $m$, $n$, than the extent of such vertical movement.

Various modifications may be made without departing from the nature of my invention as set forth in the appended claims.

I claim:

1. In an apparatus for reproducing sound by means of sound films in which the width of the darkened film portion varies according to the sounds, means for projecting a beam of light on the film, a shutter located in the path of said beam and variable perpendicularly to the path of the film, and means for controlling said shutter in such a way that the film portions extraneous to the sound record will be shuttered substantially to a line connecting the general apices of the sound record curve.

2. In an apparatus for reproducing sound by means of sound films in which the width of the darkened film portion varies according to the sounds, means for projecting a beam of light on the film, a shutter located in the path of said beam and variable perpendicularly to the path of the film, and an auxiliary photo-electric system controlling said shutter in such a way that the film portions extraneous to the sound record will be shuttered substantially to a line connecting the general apices of the sound record curve.

3. In an apparatus for reproducing sound by means of sound films in which the width of the darkened film portion varies according to the sounds, means for projecting a beam of light on the film, a shutter located in the path of said beam and variable perpendicularly to the path of the film, and an auxiliary photo-electric system controlling said shutter electromagnetically in such a way that the film portions extraneous to the sound record will be shuttered substantially to a line connecting the general apices of the sound record curve.

4. In an apparatus for reproducing sound by means of sound films in which the width of the darkened film portion varies according to the sounds, means for projecting a beam of light on the film, a shutter located in the path of said beam and variable perpendicularly to the path of the film, and an auxiliary photo-electric system comprising a source of light and a light sensitive cell, said auxiliary system controlling said shutter in such a way that the film portions extraneous to the sound record will be shuttered substantially to a line connecting the general apices of the sound record curve.

5. In an apparatus for reproducing sound by means of sound films in which the width of the darkened film portion varies according to the sounds, means for projecting a beam of light on the film, a shutter located in the path of said beam and variable perpendicularly to the path of the film, and an auxiliary photo-electric system comprising a source of light, a light sensitive cell, an electromagnet controlled by said cell, a choke and a capacity in circuit with said electromagnet and said cell, and means, controlled by said electromagnet, for controlling said shutter in such a way that the film portions extraneous to the sound record will be shuttered substantially to a line connecting the general apices of the sound record curve.

6. In an apparatus for reproducing sound by means of sound films in which the width of the darkened film portion varies according to the sounds, means for projecting a beam of light on the film, a shutter located in the path of said beam and variable perpendicularly to the path of the film, and an auxiliary photo-electric system comprising a source of light, means for projecting a beam of light from said source on the film and giving such beam, at its point of passage through the film, a width which is a multiple of the width of a single wave of the lowest sound frequency recorded, a light-sensitive cell in the path of said beam, and means, controlled by said cell, for controlling said shutter in such a way that the film portions extraneous to the sound record will be shuttered substantially to a line connecting the general apices of the sound record curve.

7. In an apparatus for reproducing sound by means of sound films in which the width of the darkened film portion varies according to the sound, means for projecting a beam of light on the film, a shutter located in the path of said beam and variable perpendicularly to the path of the film, said shutter comprising a stationary member and a movable member the co-operating edges of which form an acute angle with one another and are adapted to overlap more or less, and means for controlling the movable member of said shutter in such a way that the film portions extraneous to the sound record will be shuttered substantially to a line connecting the general apices of the sound record curve.

8. In an apparatus for reproducing sound by means of sound films in which the width of the darkened film portion varies according to the sounds, means for projecting a beam of light on the film, a shutter located in the path of said beam and variable perpendicularly to the path of the film, and an auxiliary photo-electric system comprising means for projecting a beam of light on the film at a point different from the first-mentioned beam, and controlling said shutter in such a way that the film portions extraneous to the sound record will be shuttered substantially to a line connecting the general apices of the sound record curve, the distance between the points at which the two beams of light strike the film being such that the time consumed by the film in traveling this distance will be equal to the reaction time of the auxiliary system from the moment of the modulation of the auxiliary beam of light to the moment of the movement of the shutter located in the path of the main beam of light.

In testimony whereof I affix my signature.
ERWIN GERLACH.